US011258254B2

United States Patent
Balpe et al.

(10) Patent No.: US 11,258,254 B2
(45) Date of Patent: Feb. 22, 2022

(54) ELECTRICAL DISTRIBUTION DEVICE COMPRISING AT LEAST ONE POWER CONTROLLER

(71) Applicant: SAFRAN ELECTRICAL & POWER, Blagnac (FR)

(72) Inventors: Cédric Balpe, Blagnac (FR); Philippe Preciat, Blagnac (FR); Antonio Li Ku, Blagnac (FR); Youssouf Camara, Blagnac (FR)

( * ) Notice: Subject to any disclaimer, the term of this patent is extended or adjusted under 35 U.S.C. 154(b) by 122 days.

(21) Appl. No.: 16/081,725

(22) PCT Filed: Feb. 28, 2017

(86) PCT No.: PCT/FR2017/050446
§ 371 (c)(1),
(2) Date: Aug. 31, 2018

(87) PCT Pub. No.: WO2017/149238
PCT Pub. Date: Sep. 8, 2017

(65) Prior Publication Data
US 2019/0027930 A1  Jan. 24, 2019

(30) Foreign Application Priority Data
Mar. 1, 2016  (FR) ...................................... 1651730

(51) Int. Cl.
*H02J 1/12* (2006.01)
*B64D 41/00* (2006.01)
(Continued)

(52) U.S. Cl.
CPC ................ *H02J 1/12* (2013.01); *B64D 41/00* (2013.01); *H02J 1/00* (2013.01); *H02J 1/14* (2013.01);
(Continued)

(58) Field of Classification Search
CPC ........ H02J 1/12; H02J 1/00; H02J 1/14; H02J 9/002; H02J 1/108; B64D 41/00;
(Continued)

(56) References Cited

U.S. PATENT DOCUMENTS 5,864,221 A * 1/1999 Downs .................... H02J 1/108
320/134
6,700,386 B2  3/2004 Egami
(Continued)

FOREIGN PATENT DOCUMENTS

EP          2 980 946 A1    2/2016
WO    WO 2009/125013 A2   10/2009

OTHER PUBLICATIONS

International Search Report as issued in International Patent Application No. PCT/FR2017/050446, dated May 9, 2017.

*Primary Examiner* — John W Poos
*Assistant Examiner* — Alex W Lam
(74) *Attorney, Agent, or Firm* — Pillsbury Winthrop Shaw Pittman LLP

(57) ABSTRACT

An electrical distribution device includes at least one power controller that is connectable to at least one electrical body, at least one local controller used to interface at least one power controller with at least one external calculator, and at least one local power supply path for powering at least one power controller and each local controller. Each power controller and each local controller includes a local DC/DC-type converter for coupling to each local power supply path. The device also includes an energy reservoir coupled to each local power supply path and to the local converters of the power controllers and the local controller.

9 Claims, 1 Drawing Sheet

Figure 1:
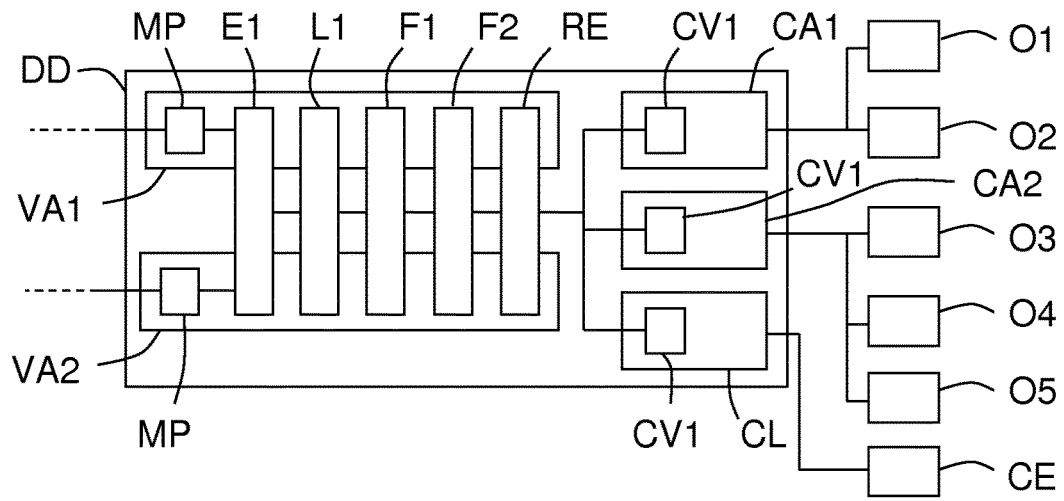

(51) Int. Cl.
  *H02J 1/14* (2006.01)
  *H02J 9/00* (2006.01)
  *H02J 1/00* (2006.01)
  *H02J 1/10* (2006.01)

(52) U.S. Cl.
  CPC .......... *H02J 9/002* (2013.01); *B64D 2221/00* (2013.01); *H02J 1/108* (2013.01); *Y02P 80/10* (2015.11)

(58) Field of Classification Search
  CPC ...... B64D 2221/00; Y02P 80/11; Y02P 80/10; H02M 3/04; H02M 3/00
  See application file for complete search history.

(56) References Cited

U.S. PATENT DOCUMENTS

| | | | |
|---|---|---|---|
| 2002/0154464 A1* | 10/2002 | Vinciarelli | H02M 1/32 361/58 |
| 2004/0124703 A1* | 7/2004 | Tani | B60R 16/0315 307/10.1 |
| 2007/0260918 A1* | 11/2007 | Okada | G06F 1/30 714/14 |
| 2011/0053173 A1* | 3/2011 | Hood | G07F 17/32 435/7.1 |
| 2013/0246815 A1* | 9/2013 | Uehara | H02J 1/04 713/300 |
| 2013/0308346 A1* | 11/2013 | Divan | A63B 21/22 363/21.01 |
| 2017/0033561 A1* | 2/2017 | Lim | H02J 3/32 |
| 2017/0063240 A1* | 3/2017 | Kumar | H02M 3/33507 |
| 2017/0201092 A1* | 7/2017 | Minato | H02J 7/00 |
| 2018/0267588 A1* | 9/2018 | Hosaka | H02J 9/00 |

* cited by examiner

ELECTRICAL DISTRIBUTION DEVICE COMPRISING AT LEAST ONE POWER CONTROLLER

CROSS-REFERENCE TO RELATED APPLICATIONS

This is the U.S. National Stage of PCT/FR2017/050446, filed Feb. 28, 2017, which in turn claims priority to French Patent Application No. 1651730, filed Mar. 1, 2016, the entire contents of all applications are incorporated herein by reference in their entireties.

The invention relates to the field of electrical distribution within systems comprising electrical (or electronic) components.

In certain systems, such as for example aircraft, it is frequent to use electrical distribution devices to supply numerous electrical components in a controlled manner. The invention more particularly relates to electrical distribution devices which are also known as SPDUs (Secondary Power Distribution Units), and which can have different architectures.

The invention more particularly further relates to SPDUs including at least one power controller (or SSPC (Solid State Power Controller)—controllable electronic circuit breaker) that can be connected to at least one electrical component of a system, at least one local controller (or "COM & CP") that can interface at least one power controller with at least one calculator outside of the system, and at least one local power supply path (or chain) (or "power supply") that can power at least one power controller and the local controller(s) from an electrical network line of the system. It will be noted that a SSPC may be laid out so as to supply a direct current (or DC) or alternating current (or AC) power supply.

In such SPDUs, the power controllers (or SSPCs) and each local controller (or COM & CPU) have a majority of common components, whereas virtually all of the components of the local power supply paths (or power supplies) are only used by the latter. This solution does not prove to be optimal in terms of costs and industrial rationalization.

The aim of the invention is thus to improve the situation, notably to optimise and to rationalize SSPC boards.

To this end, it notably proposes an electrical distribution device including at least one power controller that can be connected to at least one electrical component, at least one local controller that can interface at least one power controller with at least one external calculator, and at least one local power supply path that can power at least one power controller and each local controller.

This device is characterised by the fact that:
 each power controller and each local controller each include a local DC/DC type converter and that can be coupled to each local power supply path, and
 that it includes an energy reservoir coupled to each local power supply path, to the local converter of at least one power controller and to the local converter of at least one local controller.

Thanks to the invention, it is henceforth possible to do without DC/DC converters in each local power supply path, and thus the power controllers and each local controller may be supplied via a greatly simplified power supply path (or chain) of the system of which they form part, without intermediate conversion, including in the event of a problem occurring on this line on account of the presence of a common energy reservoir. The result is, notably, a reduction in the number of components used, a reduction in the number of types of component used and a reduction in size.

The device according to the invention may comprise other characteristics that may be taken separately or in combination, and notably:
 the local power supply paths are without DC/DC type converter;
 it may include a first so-called common mode type filter and mutualised with each local power supply path and/or a second so-called differential mode type filter and mutualised with each local power supply path;
 the energy reservoir may be a type selected from at least one so-called direct type and a so-called commuted type;
 it may include at least two local power supply paths of so-called direct current type;
 in an alternative, it may include at least one local power supply path of so-called direct current type, and at least one local power supply path of so-called alternating current type and including an AC/AC type converter and a set of electronic components that can shape the energy coming from an alternating current network to make it compatible with the energy coming from a direct current network;
 each local converter of the power controller may be a type selected from (at least) "flyback", "isolated buck", "forward", and each topology derived from "forward";
 it may include a set of electronic components that can avoid upstream propagation of faults of electrical problems occurring downstream and protect against propagation of faults between local power supply paths.

The invention also proposes a system including at least one electrical component and at least one electrical distribution device of the type of that described above and coupled to at least one electrical component.

Such a system may, for example, be an aircraft.

Figure 2:
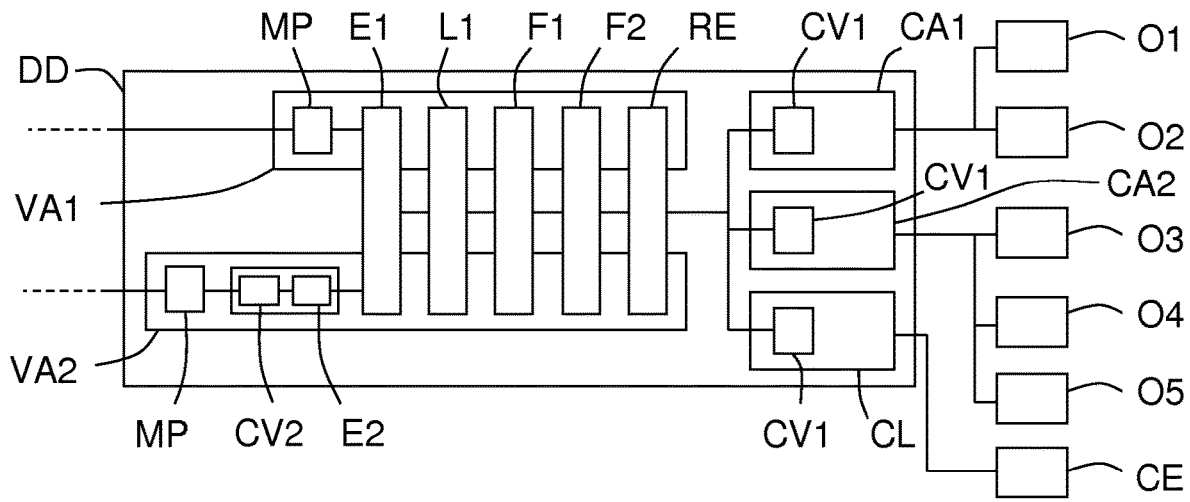

Other characteristics and advantages of the invention will become clear on examining the following detailed description and the appended drawings, in which:

FIG. 1 illustrates in a schematic and functional manner an exemplary embodiment of an electrical distribution device according to the invention, and FIG. 2 illustrates in a schematic and functional manner an alternative of the electrical distribution device of FIG. 2.

The aim of the invention is notably to propose an electrical distribution device DD constituting an SPDU and intended to equip a system for powering some of the electrical components Oi of the latter.

Hereafter, it is considered, as a non-limiting example, that the system is an aircraft, such as for example an airplane. But the invention is not limited to this type of system. Indeed, an electrical distribution device DD, according to the invention, may equip any system comprising electrical components to supply with power. Thus, it notably relates to vehicles (terrestrial, maritime (or fluvial) and aerial), installations, potentially industrial, and buildings.

In FIGS. 1 and 2 are schematically illustrated two exemplary embodiments of an electrical distribution device DD according to the invention. As illustrated, an (electrical distribution) device DD, according to the invention, includes at least one power controller (or SSPC (Solid State Power Controller) CAj, at least one local power supply path (or power supply) VAk, at least one local controller (or COM & CPU) CL, and an energy reservoir RE.

Each power controller CAj can be connected to at least one electrical component Oi of a system (here an airplane), includes a local DC/DC (direct current/direct current) type converter CV1 and that can be coupled (directly or indirectly) to each local power supply path VAk.

The/each local controller CL can interface at least one power controller CAj with at least one external calculator CE, includes a local DC/DC type converter CV1, and can be coupled to at least one local power supply path VAk.

In the exemplary embodiments illustrated in a non-limiting manner in FIGS. 1 and 2, the device DD includes two local power supply paths VA1 and VA2 (k=1 or 2) which are both coupled to two power controllers CA1 and CA2 (j=1 or 2) and to a local controller CL. The first power controller CA1 here powers two electrical components 01 and 02 (i=1 or 2), the second power controller CA2 here powers three electrical components 03, 04 and 05 (i=3 to 5), and the local controller CL is coupled to a single external calculator CE. But the first power controller CA1 could power a single electrical component or instead more than two electrical components. Similarly, the second power controller CA2 could power one or two electrical components or instead more than three electrical components. Also in the same way, the local controller CL could be coupled to several (at least two) external calculators. Furthermore, the device DD could include more or less than two power controllers CAj (which is often the case, notably in an airplane), and/or several local controllers CL.

The energy reservoir RE is coupled to each local power supply path VAk, to the local converter CV1 of at least one power controller CAj and to the local converter CV1 of at least one local controller CL.

This energy reservoir RE is intended to maintain the power supply of the power controllers CA1 and CA2 and of each local controller CL during a defined time in the event of interruption of the external sources of the airplane. The energy reservoir is thus fully intended for the internal needs of the device DD.

The energy reservoir RE may, for example, comprise capacitors or super capacitors. Furthermore, this energy reservoir RE may, for example, be a so-called direct type or a so-called commuted type, according to requirements.

This energy reservoir RE may potentially include a converter intended to raise the voltage of its energy reserve. In this case, it may, for example, be of non-inverting BOOST or BUCK-BOOST type with two or four commutators.

When the energy reservoir RE can manage or set the voltage of its energy reserve, several management strategies can be implemented during low amplitude transients of the airplane electrical network. Thus, it is possible, for example, to carry out a rise in permanent voltage to obtain an energy reserve voltage regulated beyond the maximum amplitude of the airplane electrical network, or instead an intermediate rise, potentially combined with a "follower" (non-conversion) mode during transients greater than the regulation voltage of the energy reserve.

It is important to note that each local power supply path VAk is without DC/DC type converter.

Each DC/DC converter of a power controller CAj or of a local controller CL is thus laid out so as to be able to be supplied "directly" via an electrical network line of its system, without intermediate conversion, except for the conversions associated with certain alternatives of the energy reserve. This makes it possible to do without DC/DC converters in each local power supply path VAk, and thus to reduce not only the number of components used in the device DD, but also the number of types of component used in the device DD and the size of the device DD. This proves to be advantageous in terms of costs, industrial rationalisation and implantation possibilities.

It will be noted, as illustrated in a non-limiting manner in FIGS. 1 and 2, that the device DD may potentially include, for example upstream of the energy reservoir RE, a first so-called common mode filter F1 and mutualised with each local power supply path VAk, and/or a second so-called differential mode type filter F2 and mutualised with each local power supply path VAk.

This first filter F1 is intended to filter common mode disruptions, whereas the second filter F2 is intended to filter differential mode disruptions.

It will also be noted, as illustrated in a non-limiting manner in FIGS. 1 and 2, that the device DD may potentially include, upstream of its optional first filter F1, a set of electronic components E1 intended to avoid upstream propagation of faults (and thus towards the airplane electrical network) of electrical problems that have occurred downstream (for example in a local power supply path VAk or an electrical component Oi), such as for example in the event of a short-circuit, and to protect against propagation of faults between the local power supply paths VAk (when the device DD includes several thereof).

This set of electronic components E1 constitutes an N to 1 type interface, where N is the number of local power supply paths VAk. This interface E1 may, for example, include N functions OU with diodes. When N=2, as illustrated in a non-limiting manner, this gives a 2 to 1 type interface E1, for example including two functions OU with diodes.

It will also be noted, as illustrated in a non-limiting manner in FIGS. 1 and 2, that the device DD may optionally include, for example between its optional set E1 and its optional first filter F1, a current limiter L1 mutualised with each local power supply path VAk. This current limiter L1 is more particularly useful when the energy reservoir RE mainly includes capacitors or super capacitors, without means that can manage or set the voltage.

It will also be noted, as illustrated in a non-limiting manner in FIGS. 1 and 2, that each local power supply path VAk may optionally include in input (upstream of the optional set E1) a protection module MP, preferably not mutualised, and intended to divert (or direct) to the structure (here of the airplane) dangerous electrical pulses coming from the airplane electrical network. The protection module MP must be placed a near as possible to the physical interfaces (connectors) and must thus be dedicated to an interface with an external airplane source.

In the example of FIG. 1 the device DD includes two local power supply paths VA1 and VA2 (k=1 or 2) of so-called direct current (or DC) type of which most of the functional elements (RE and potentially E1, L1, F1 and F2), except for their respective optional protection modules MP, are mutualised. But the device DD could comprise more than or less than two local power supply paths VAk of so-called direct current type. This layout of FIG. 1 is adapted to the direct current (or DC) power supply of electrical components.

In the example of FIG. 2 the device DD includes a local power supply path VA1 (k=1) of so-called direct current type and a local power supply path VA2 (k=2) of so-called alternating current (or AC) type which have in common several functional elements (RE and potentially E1, 5 L1, F1 and F2). This makes it possible to supply certain electrical components Oi with direct current and certain other electrical components Oi' (i'≠i) with alternating current as a function of their respective layouts.

The local power supply path VA1 (of DC type) is similar to that described above with reference to FIG. 1. Consequently, everything that has been stated previously regarding the local power supply path VA1 of FIG. 1 also applies to the local power supply path VA1 of FIG. 2. The local power supply path VA2 (of AC type) notably includes an AC/AC type converter CV2 and a set of electronic components E2 intended to shape the energy coming from the alternating current (AC) network of the airplane to make it compatible with the energy coming from the direct current (DC) network of the airplane. The set of electronic components E2 may, for example, constitute at least one diode rectification. Such a converter CV2 then constitutes with the set of electronic components E2 what those skilled in the art sometimes call an AC(TRI)/DC type converter. In another embodiment, the set of electronic components E2 may, for example, be a rectifier with six diodes associated with filters, the converter CV2 then being for example a DC/DC converter.

Like the local power supply path VA1, the local power supply path VA2 may also include an optional protection module MP (similar to that described above) upstream of the converter CV2.

In the examples of FIGS. 1 and 2, each local converter CV1 5 may, for example, be of "flyback" or "isolated buck" (or "buck with isolated auxiliary winding") or "forward" type or any topology derived from the forward type (such as for example "single switch forward", "two switches forward", "push pull", "half bridge" or "full bridge").

Generally speaking, each local converter CV1 is preferentially constituted of integrated electronic components tolerating a wide input voltage range (as is the case on an electrical network of a system such as an airplane).

It will be noted that the device DD could comprise more than one direct current (DC) local power supply path and/or more than one alternating current (AC) local power supply path.

The invention offers several advantages, among which:
an elimination of centralised power converters which enables a direct connection of the power controllers (or SSPCs) and the local controller to the electrical network of the system to withdraw the energy that they have need of without intermediate electrical energy conversion,
a possible adaptation to alternating current (AC) power supplies by insertion of an AC (Tri)/DC type converter of which the output voltage is similar to the electrical network of the system, so as to standardise each DC/DC converter within the power controllers CAj. This adaptation may, in the case of an association of DC board and AC board (the centre of greater losses than the DC board) and a dimensioning of the AC(Tri)/DC converter so that it nominally generates a voltage below that of the DC electrical network of the system, to enable the SSPCs and local controller of the two AC and DC boards to consume in priority on the DC electrical network in order not to generate losses within the additional AC(Tri)/DC converter and the AC board. Indeed, it will be understood that this would make it possible to reduce the losses of the AC boards by displacing them in normal condition to the DC boards and thus to homogenise the spread of losses between DC and AC boards.

The invention is not limited to the embodiments of electrical distribution device and system described above, only by way of example, but it encompass all the variants that those skilled in the art could envisage within the sole scope of the claims hereafter.

The invention claimed is:

1. An electrical distribution device configured for connection to at least one electrical component of a system to supply power thereto, the electrical distribution device comprising:
at least one power controller that is connectable to the at least one electrical component of the system so as to provide the supply of power to the at least one electrical component,
at least one local controller adapted to interface the at least one power controller with at least one external calculator that is outside of the system, and
local power supply paths adapted to supply power from an external source to the at least one power controller and the at least one local controller, wherein each local power supply path is without a DC/DC type converter,
wherein the at least one power controller and the at least one local controller each include a DC/DC type local converter adapted to be coupled to the local power supply paths, and
the device further comprising an energy reservoir coupled to: the local power supply paths, to the DC/DC type local converter of the at least one power controller and to the DC/DC type local converter of the at least one local controller, wherein, upon interruption of the power from the external source, the energy reservoir is configured to maintain a power supply of the at least one power controller and of the at least one local controller for a defined time.

2. The electrical distribution device according to claim 1, wherein the local power supply paths are without DC/DC type converter.

3. The electrical distribution device according to claim 1, further comprising a first common mode type filter which is mutualised between the local power supply paths and/or a second differential mode type filter which is mutualised between the local power supply paths.

4. The electrical distribution device according to claim 1, wherein the energy reservoir is of direct type or commuted type.

5. The electrical distribution device according to claim 1, wherein at least two local power supply paths are of direct current type.

6. The electrical distribution device according to claim 1, wherein at least one local power supply path is of direct current type, and at least one local power supply path is of alternating current type, said device further comprising an AC/AC type converter and a set of electronic components adapted to shape the energy coming from an alternating current network to make it compatible with the energy coming from a direct current network.

7. The electrical distribution device according to claim 1, wherein each local converter is of flyback, or isolated buck, or forward type and each derivative of the forward type.

8. The electrical distribution device according to claim 1, further comprising a set of electronic components with diodes suited to avoiding upstream propagation of short-circuits or other types of electrical faults occurring downstream and preventing propagation of such electrical faults between the local power supply paths.

9. A system comprising at least one electrical component, and at least one electrical distribution device according to claim 1 coupled to the at least one electrical component.

* * * * *